UNITED STATES PATENT OFFICE.

RUDOLPH D'HEUREUSE, OF NEW YORK, N. Y.

IMPROVEMENT IN TREATING ORGANIC MATERIALS WITH AIR.

Specification forming part of Letters Patent No. 93,182, dated August 3, 1869; Reissue No. 3,921, dated April 19, 1870.

*To all whom it may concern;*

Be it known that I, RUDOLPH D'HEUREUSE, of the city, county, and State of New York, have invented a new and Improved Mode of Purifying, Preserving, or Improving Liquid or other Substances, of which the following is a specification.

I have discovered that the albuminous nitrogenous parts which are contained in all crude organic substances are the basis of putrefaction, mold, or decay, and that the oxygen of the air, properly directed, is an excellent agent to prevent the deterioration of said fluid or solid substances. This result is obtained at temperatures conformably to the nature of the substance and object in view by means of artificial currents of air through said substances. When the nitrogenous parts undergo oxidation, the albuminous parts are rendered insoluble, and may be removed from the liquid or semi-fluid by filtration, skimming, or settling, and thus purified they are brought to an improved state of preservation; or, if the albuminous parts be retained, they may by additional processes be cured and rendered innoxious—for instance, in tanning operations, in curing meats in pickle, &c. To restore or keep fluid as well as solid substances where rot or putrefaction has already acted or is imminent—for instance, flesh, fats, fruits, or other vegetable matter—sulphurous vapors or other gases should be employed at times in connection with air, thereby to intercept the ravages of putrefying agents at work. The temperature of the air employed, or of the substance while treated, should in no case be below the freezing-point of the liquid; but generally for the purification of aqueous or oleaginous juices, or of extracts—beer, &c—their temperature should be between 130° Fahrenheit and the boiling-point—a temperature at which organic function ceases; for the purification of alcholic spirits, from 100° Fahrenheit to the boiling-point; for water, the common temperature; for preserving solid animal or vegetable substance, from 40° to 100° Fahrenheit. Common water in cisterns, reservoirs, or other receptacles is principally, in the warm season of the year, contaminated by organic substances taken from the soil through which it passes, or from the air above; and these organic substances putrefying are the fruitful cause of numerous diseases, by which annually thousands of valuable lives are lost. Currents of air through the water purify it by oxidizing the said putrefying elements. The albuminous or nitrogenous parts in oleaginous or saccharine juices, in extracts from organic matter, or in spirits form the principal part of the impurities which cause rancidity, deterioration, or unpleasant taste. These causes are removed by the oxidizing action of the oxygen of the impelled air.

To enable others skilled in the art to make and use my invention, I shall proceed to describe the same.

Air of proper temperature, alone or other gases in connection with it, is injected into the fluid or semi-fluid under treatment by pipes, open or perforated, or provided with perforated mouth-pieces or plates, and stationary at the time, or in motion at or near the bottom of the vessel in which the substance is contained. The air is impelled by pump or other blowing apparatus connected with said injection pipes or plates by hose, pipes, or other conveyance. While the air rises upward through a fluid substance, it necessarily agitates the same, and by this mechanical action brings every part in intimate contact with the chemically-acting oxygen. The currents of air or other gases are admitted periodically or continuously till the required purification is effected. The mechanical action in the process is inseparable from it and forms part of it; and it is obvious that finely-divided air acts more vigorously, as it gives more surface contact than passing in bulk through fluid. It is likewise obvious that by the use of currents of common air or other gases they have the tendency to carry off vapors which may be desirable, or which may be recovered or benefited by employing close vessels and condensers. However, the principal object in view is the preservation, purification, and improving by the chemical action of the oxygen of the air, or the influence of the sulphurous vapors or other gases, when employed in connection with the air. To arrest or prevent putrefaction or decay in, and thus to cure solid substances—for instance, meats, fruits, produce, tobacco, &c., or corpses—the currents of air, alone or in connection with sulphurous vapors or other gases, are impelled by the blowing apparatus, and enter by conduits, perforated or otherwise, mouth-pieces or perforated plates at or near the bottom of the compartments in which the solids to be treated are contained, so that the air and gases, in minutely-divided currents, are brought in intimate and uniform contact with every part. Air-tight compartments, only admitting ingress of the impelled air or gases and exit for their discharge, may be employed.

I do not claim the use of artificial currents of air, previously cooled or dried, or otherwise voided, by chemical or mechanical means, of some of its constituents, for the mere purpose of drying, and by the prevention of oxidation to preserve grain, fruit, or other solid organic substances, as this has been employed by other parties; but What I do claim, and desire to secure by Letters Patent, is—

1. The mode of purifying and improving organic fluids or semi-fluids by impelling air through the same, in any manner described, to effect the purpose, and thus, with the inseparable mechanical agitation, to induce an oxidation of the nitrogenous parts in the fluids or in the solids that may be immersed, to preserve and otherwise improve them.

2. The mode of arresting or preventing putrefraction or decay in organic fluids or solids by artificial currents of air or air in connection with sulphurous vapors or other gases through said substances, substantially in the manner and for the puprpose described and set forth.

RUDOLPH D'HEUREUSE.

Witnesses:

LEWIS PAYNE,

FRANCIS A. TEALL.